United States Patent
Lan

(10) Patent No.: US 9,380,666 B2
(45) Date of Patent: Jun. 28, 2016

(54) LED DRIVING DEVICE AND METHOD FOR IMPROVING HARMONIC CURRENT DISTORTION ON A LED DRIVING DEVICE

(71) Applicant: PRINCETON TECHNOLOGY CORPORATION, New Taipei (TW)

(72) Inventor: Yu-Chin Lan, New Taipei (TW)

(73) Assignee: PRINCETON TECHNOLOGY CORPORATION, New Taipei (TW)

(*) Notice: Subject to any disclaimer, the term of this patent is extended or adjusted under 35 U.S.C. 154(b) by 0 days.

(21) Appl. No.: 14/827,984

(22) Filed: Aug. 17, 2015

(65) Prior Publication Data

US 2016/0073462 A1   Mar. 10, 2016

(30) Foreign Application Priority Data

Sep. 9, 2014  (TW) .............................. 103130949 A

(51) Int. Cl.
  *H05B 37/02*   (2006.01)
  *H05B 33/08*   (2006.01)

(52) U.S. Cl.
  CPC ........ *H05B 33/0827* (2013.01); *H05B 33/0812* (2013.01)

(58) Field of Classification Search
  CPC ...................................................... H05B 33/08
  USPC ............. 315/291, 307, 312, 246, 247, 185 R, 315/200 R
  See application file for complete search history.

(56) References Cited

U.S. PATENT DOCUMENTS

| | | | | |
|---|---|---|---|---|
| 8,410,717 B2* | 4/2013 | Shteynberg | ........ | H05B 33/0812 315/185 R |
| 2010/0308739 A1* | 12/2010 | Shteynberg | .......... | H05B 33/083 315/193 |
| 2012/0081008 A1* | 4/2012 | Chen | .................. | H05B 33/0809 315/122 |
| 2013/0026935 A1* | 1/2013 | Jong | .................. | H05B 33/0818 315/201 |
| 2013/0207548 A1* | 8/2013 | Leshniak | ........... | H05B 33/0803 315/121 |
| 2013/0320868 A1* | 12/2013 | Kim | ..................... | H05B 33/083 315/186 |

* cited by examiner

*Primary Examiner* — Minh D A
(74) *Attorney, Agent, or Firm* — Muncy, Geissler, Olds & Lowe, P.C.

(57) ABSTRACT

A LED driving device is provided. The LED driving device includes a multi-segment linear LED driver, first current-compensating device and second current-compensating device. The LED driving device is used to drive a LED device which is composed by a plurality of serial LED modules. The multi-segment linear LED driver selectively provides a first path to a first LED module of the LED modules for flowing a first constant current, or provides a second path to the first LED module and a second LED module of the LED modules for flowing a second constant current. When the first path is provided, first compensating current flows through the first current-compensating device. When the second path is provided, the first current-compensating device stops conducting the first compensating current. When the second path is provided, second compensating current flows through the second current-compensating device.

8 Claims, 10 Drawing Sheets

LED DRIVING DEVICE AND METHOD FOR IMPROVING HARMONIC CURRENT DISTORTION ON A LED DRIVING DEVICE

CROSS REFERENCE TO RELATED APPLICATION

The present application is based on, and claims priority from, Taiwan (International) Application Serial Number 103130949, filed. Sep. 9, 2014, the invention of which is hereby incorporated by reference herein in its entirety.

TECHNICAL FIELD

The disclosure relates to a driving device, and more particularly to a light emitting diode (LED) driving device improving harmonic current distortion.

BACKGROUND

Multi-segment linear driver is broadly used to drive LED device. However, linear driver leads to harmonic current distortion. International standard IEC 61000-3-2 regulates to limit harmonic current distortion and most of existing linear drivers and multi-segment linear drivers cannot meet the requirements of IEC 61000-3-2. The present method for improving the harmonic current distortion of the linear driver increases the number of segments of the multi-segment linear driver IC. When the number of segments is increased to 5 or 6, the multi-segment linear driver can meet the requirements of IEC 61000-3-2. However the above method leads to higher cost and more difficulty in design. Moreover, if the linear drivers or the multi-segment linear drivers are made of discrete components, it will raise the price of the product and increase the dimension of product. The two methods mentioned above are unfavorable to mass production and market penetration for the LED drivers. In view of this, the present disclosure provides a new LED driving device to improve harmonic current distortion without increasing the number of multi-segment.

SUMMARY

An embodiment of the present disclosure provides a light emitting diode (LED) driving device. The LED driving device is used to drive a LED device which is composed by a plurality of serial LED modules. The LED device is coupled to a driving voltage source. The LED driving device comprises a multi-segment linear LED driver, a first current-compensating and a second current-compensating device. The multi-segment linear LED driver is coupled to the LED modules. The multi-segment linear LED driver selectively provides a first path to a first LED module of the LED modules for flowing a first constant current, or provides a second path to the first LED module and a second LED module of the LED modules for flowing a second constant current. The first current-compensating device is connected to the second module in parallel, wherein when the first path is provided, the first compensating current flows through the first current-compensating device, and when the second path is provided, the first current-compensating device stops conducting the first compensating current. The second current-compensating device coupling to the second LED module, wherein when the second path is provided, the second compensating current flows through the second current-compensating device.

In an embodiment of the present disclosure, the multi-segment linear LED driver further selectively provides a third path to the first LED module, the second module, and a third LED module of the LED modules for flowing a third constant current, wherein when the third path is provided, the first current-compensating device stops conducting the first compensating current, and the second current-compensating device stops conducting the second compensating current.

In an embodiment of the present disclosure, the third LED module is the last LED module of the serial LED modules, and the LED driving device further comprises a third current-compensating device. The third current-compensating device is couple to the third LED module. When the third path is provided, the third compensating current flows through the third current-compensating device.

Another embodiment of the present disclosure provides a method for improving harmonic current distortion on a light emitting diode (LED) driving device, wherein the LED driving device is used to drive a LED device which is composed by a plurality of serial LED modules the LED device is coupled to a driving voltage source. The method comprises selectively providing a first path to a first LED module of the LED modules for flowing a first constant current, or providing a second path to the first LED module and a second LED module of the LED modules for flowing a second constant current. The method further comprises providing a first compensative path such that a first compensating current flows through the first current-compensating device when the first path is provided. The method further comprises providing a second compensative path such that a second compensating current flows through the second current-compensating device, and stopping conducting the first compensating current when the second path is provided.

In an embodiment of the present disclosure, the method of the present disclosure further comprises selectively providing a third path to the first LED module, the second module, and a third LED module of the LED modules for flowing a third constant current, and stopping conducting the first compensating current, the second compensating current, the first constant current and the second constant current when the third path is provided.

In an embodiment of the present disclosure, the third LED module of the present disclosure is the last LED module of the serial LED modules, and the method of the present disclosure further comprises driving the third compensating current flow through the first, second and third LED modules when the third path is provided.

The LED driving device and the corresponding improving method of the present disclosure can improve the harmonic current distortion without increasing the number of multi-segment of the LED driver. Additionally, the present disclosure can increase the usage of LED, contribute to improve the overall light output, and enhance the power factor.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
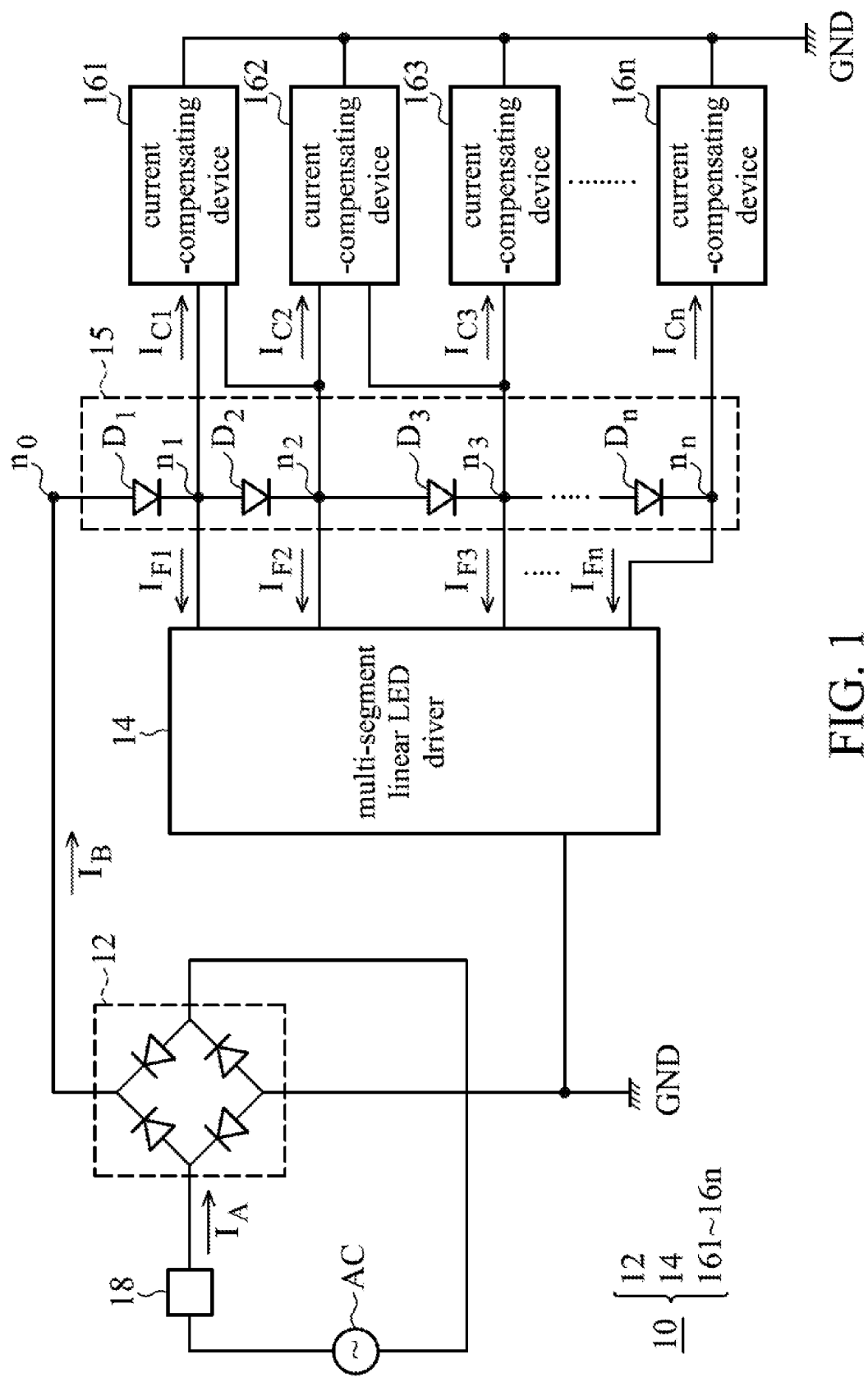
FIG. 1 shows a schematic diagram of a light emitting diode (LED) driving device 10 used to drive a LED device 15 according to an embodiment of the present disclosure.

FIG. 1 shows a schematic diagram of a light emitting diode (LED) driving device 10 used to drive a LED device 15 according to an embodiment of the present disclosure. The LED device 15 is composed by a plurality of LED modules $D_1$-$D_n$ connected in series, wherein n is a positive integer and determined by the circuit designer, i.e. a plurality of LED may be divided into n groups of the LED modules for design requirement. Each of the LED modules $D_1$-$D_n$, may include one LED or a plurality of LEDs connected in series. For brevity, each of the LED modules $D_1$-$D_n$ in FIG. 1 is shown by one LED pattern.

The LED driving device 10 comprises a rectifier 12, a multi-segment LED driver 14, and a plurality of current-compensating device 161-16n, wherein n is a positive integer and equal to the number of the LED modules. An external device 18 may be provided between an alternating-current voltage source AC and the rectifier 12 of the LED driving device 10. The external device 18 may be an inductor or a fuse, but it is not limited thereto. The alternating-current voltage source AC, through the external device 18, provides alternating-current power to the rectifier 12. The rectifier 12 is coupled between the alternating-current voltage source AC and the LED device 15 and used to transform the alternating-current voltage into a driving voltage source. The rectifier 12 may be any type of rectifier, for example the bridge rectifier, but it is not limited thereto. The multi-segment LED driver 14 is coupled to the LED modules $D_1$-$D_n$ and used to drive the LED modules $D_1$-$D_n$, wherein the segment number of the multi-segment LED driver 14 is the same as the number of LED modules $D_1$-$D_n$. The LED driving device 10 of the present disclosure, through improving the current waveform of the internal current $I_B$ of the LED driving device 10, indirectly improves (reduces) the harmonic distortion of input current $I_A$ of the LED driving device 10 and reduces the harmonic current distortion of the alternating-current voltage source AC.

The current-compensating device 161 is coupled between a node $n_1$ and a node $n_2$, and connected to the LED module $D_2$ in parallel. The current-compensating device 162 is coupled between the node $n_2$ and a node $n_3$, and connected to the LED module $D_3$ in parallel. Except the current-compensating device 16n, the connection of the rest of current-compensating devices is the same as the connection of the current-compensating devices 161 and 162. The current-compensating device 16n is coupled to a node $n_n$.

The multi-segment LED driver 14 selectively conducts the constant current $I_{F1}$, $I_{F2}$ . . . or $I_{Fn}$. More specifically, the multi-segment LED driver 14 only conducts one of the constant current $I_{F1}$, $I_{F2}$ . . . and $I_{Fn}$. The magnitudes of the constant current $I_{F1}$, $I_{F2}$ . . . and $I_{Fn}$ are different. In a specific embodiment, the magnitude of the constant current $I_{F1}$ is lower than the magnitude of the constant current $I_{F2}$, the magnitude of the constant current $I_{F2}$ is lower than the magnitude of the constant current $I_{F3}$, and so on. The current-compensating devices 161-16n do not simultaneously conduct the compensating current. For instance, when the current-compensating device 161 conducts the compensating current $I_{C1}$, the rest of current-compensating devices 162-16n do not conduct the compensating current. It is worth noting that when the multi-segment LED driver 14 conducts the constant current $I_{F1}$, the current-compensating device 161 conducts the compensating current $I_{C1}$; when the multi-segment LED driver 14 conducts the constant current $I_{F2}$, the current-compensating device 162 conducts the compensating current $I_{C2}$; and so on.

Figure 2:
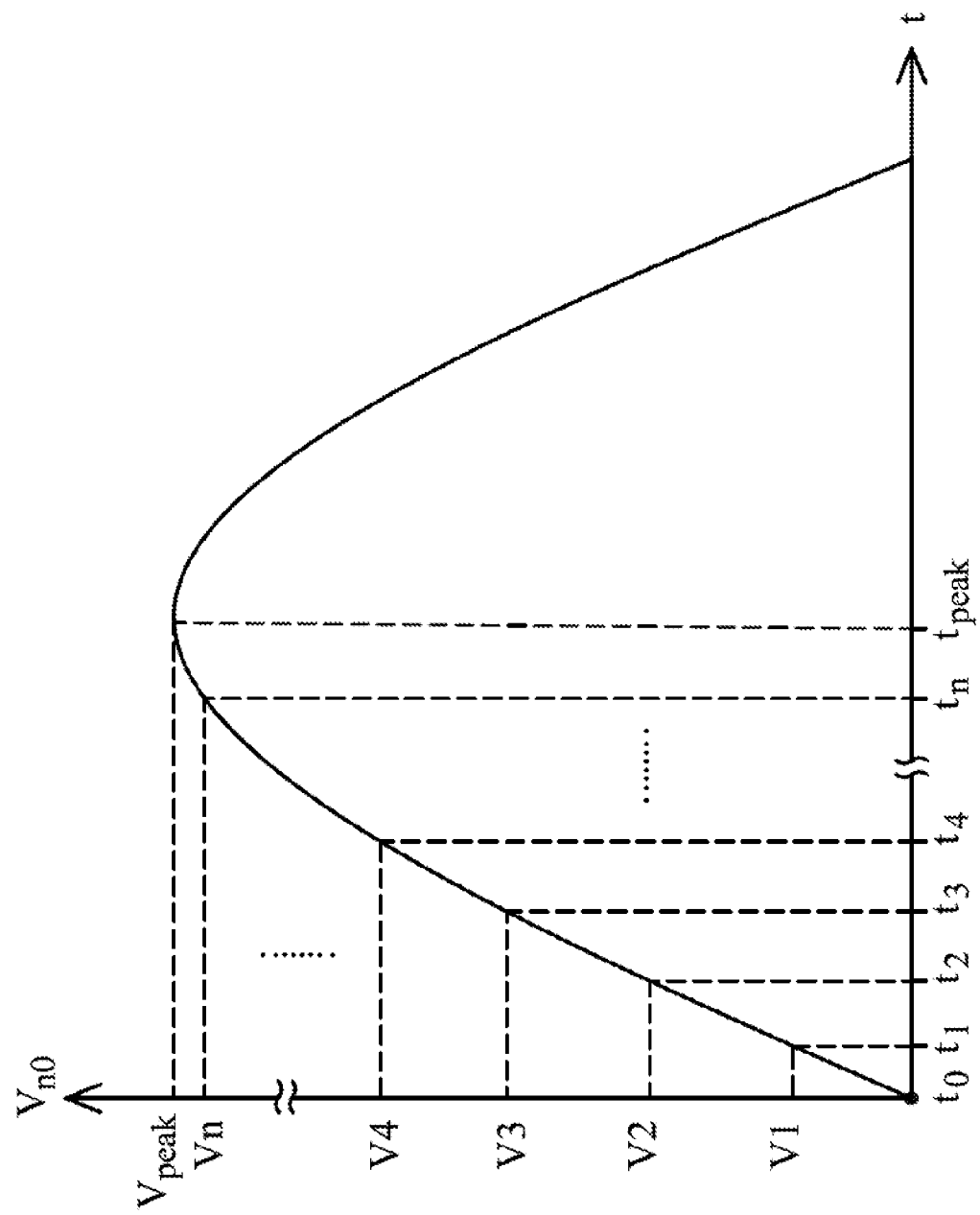
FIG. 2 shows a voltage waveform diagram at the node $n_0$ of FIG. 1 according to an embodiment of the present disclosure.
Figure 3A:
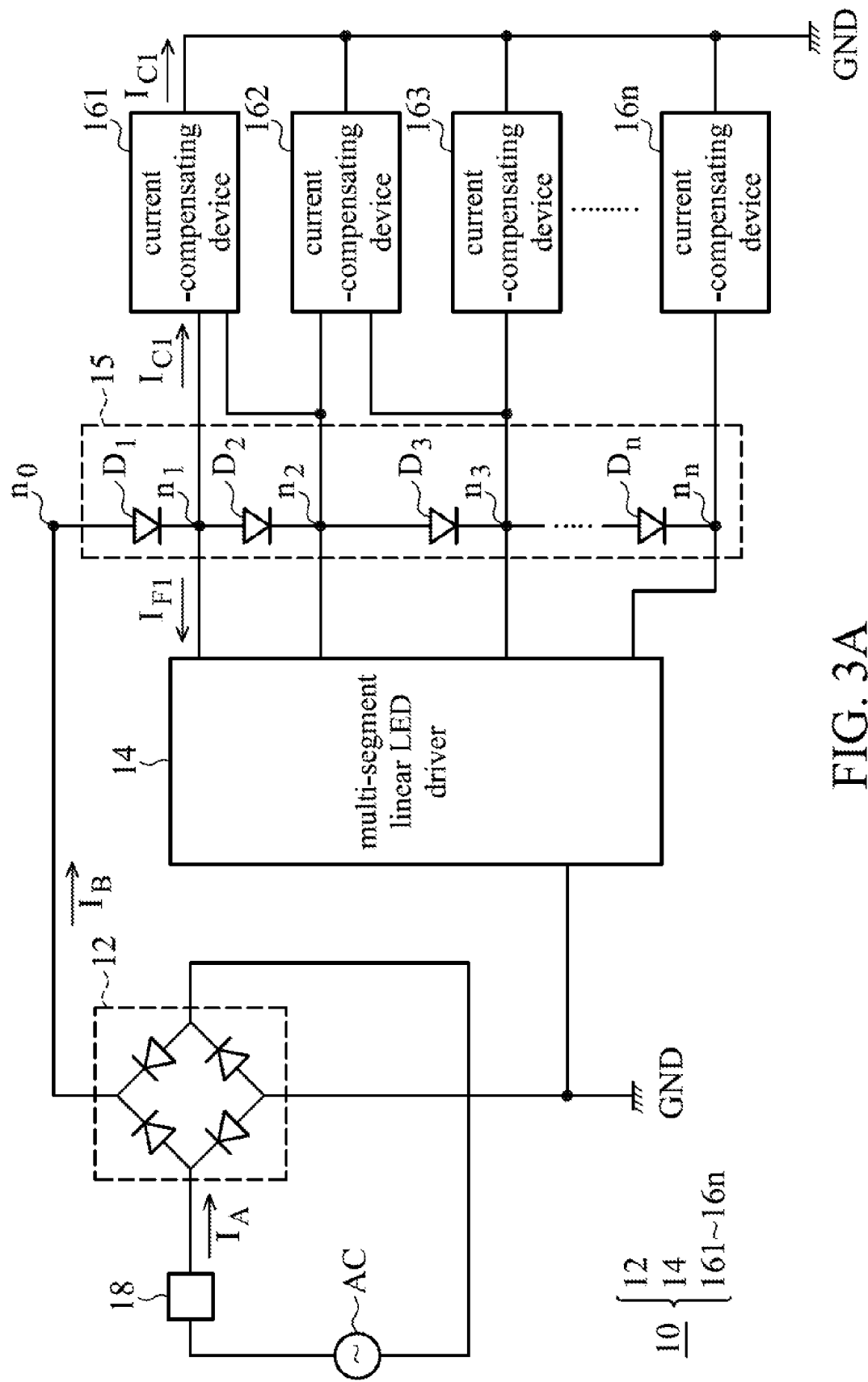
FIG. 3A-3C show the operation of the multi-segment linear LED driver 14 and the current-compensating devices 161-16$n$ while applying the voltage waveform at the node $n_0$ of FIG. 2.
Figure 3B:
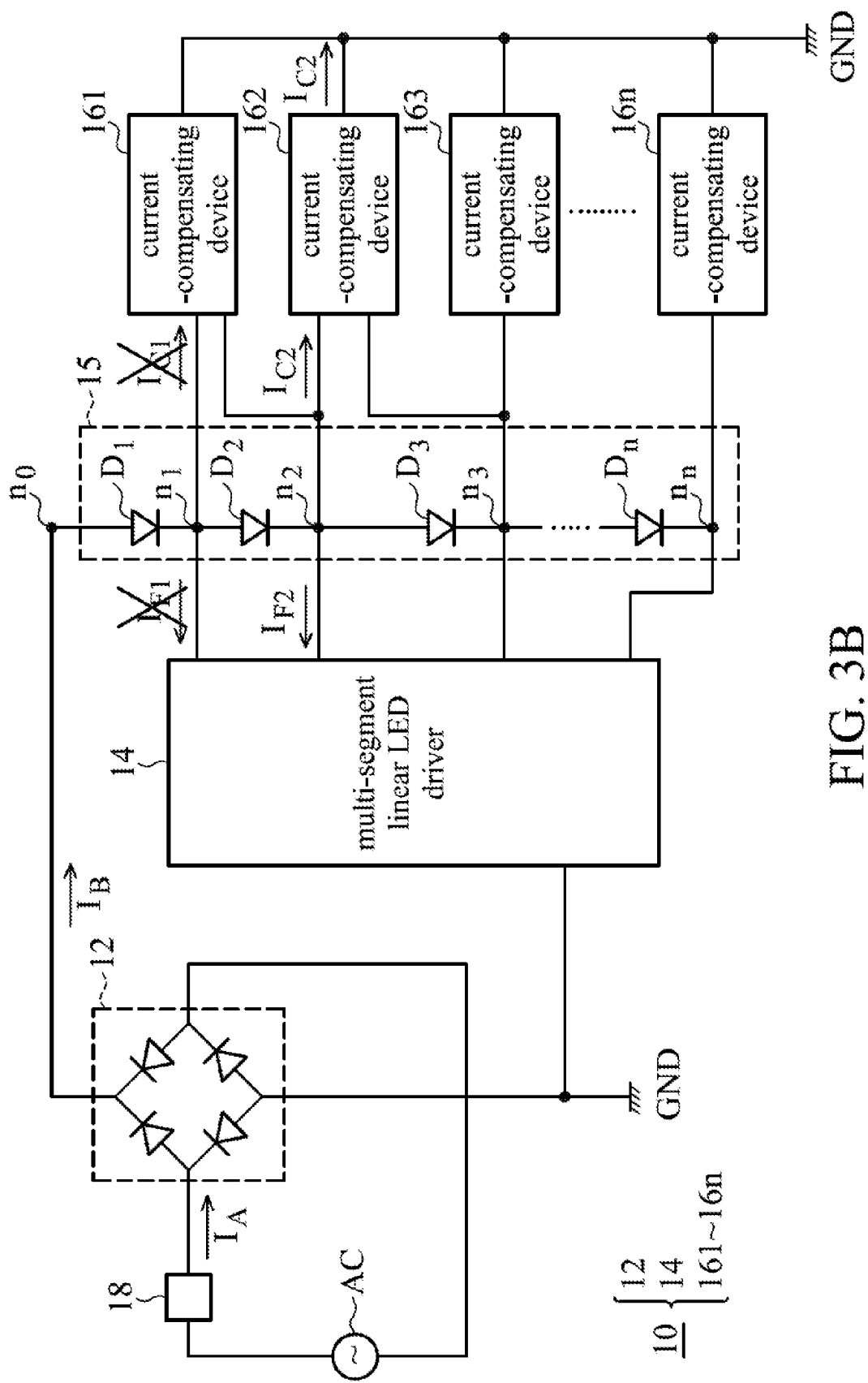
Figure 3C:
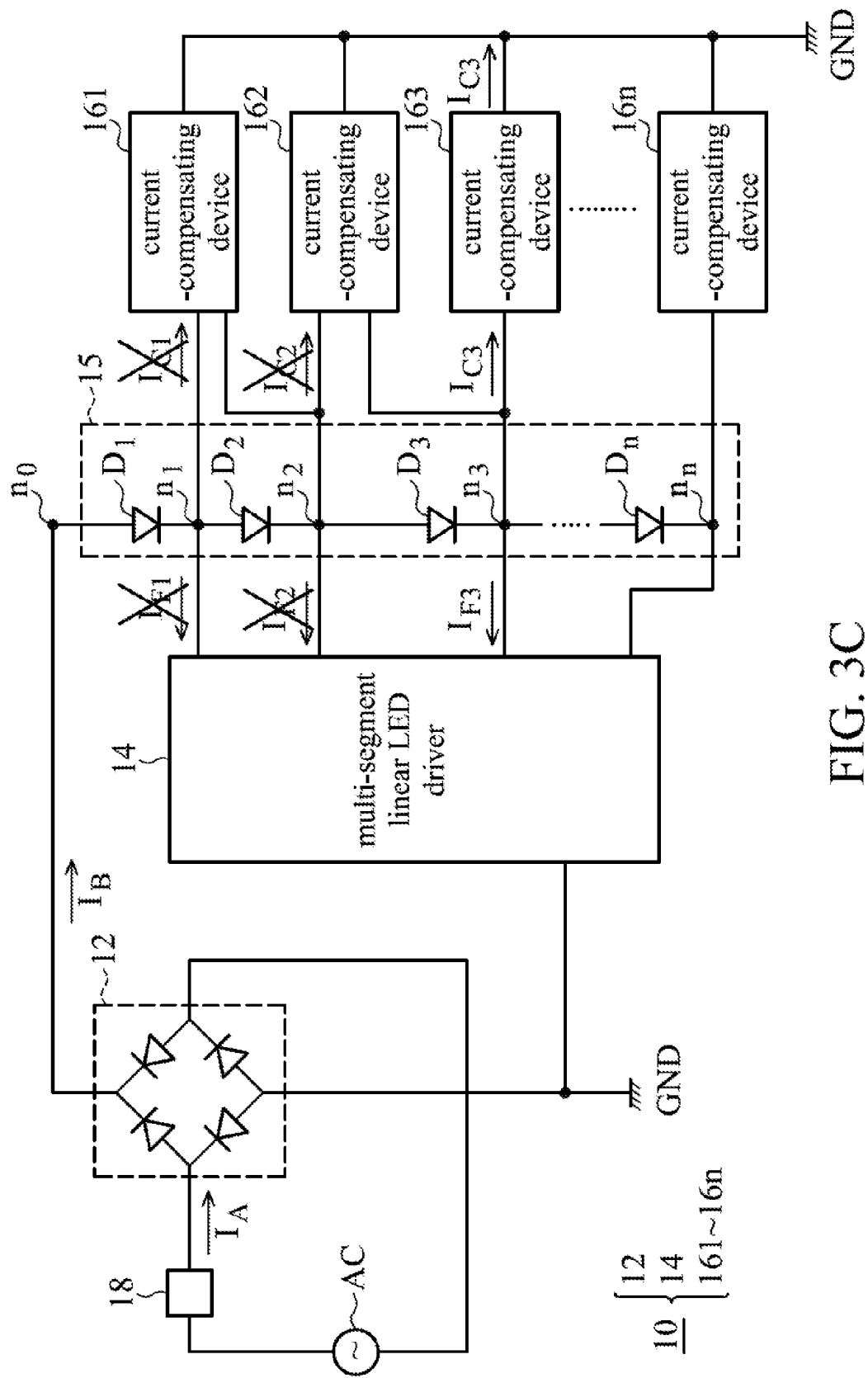

FIG. 2 shows a (rectified) voltage waveform at the node $n_0$ of FIG. 1 according to an embodiment of the present disclosure. FIG. 3A-3C show the operation of the multi-segment linear LED driver 14 and the current-compensating devices 161-16n while applying the voltage waveform at the node $n_0$ of FIG. 2. Referring to FIG. 2, during the time period of $t_0$-$t_{peak}$, the voltage at node $n_0$ gradually increases, the LED module $D_1$ conducts first, then the LED module $D_2$ conducts, and subsequently the LED modules $D_3$~$D_n$ conduct one by one.

More specifically, referring to FIG. 2, during the time period of $t_0$-$t_1$, the voltage $V_{n0}$ at node $n_0$ is lower than the voltage V1, the LED module $D_1$ turns off, and the multi-segment linear LED driver 14 and the current-compensating device 161 do not conduct currents.

Referring to FIG. 2 and FIG. 3A, during the time period of $t_1$-$t_2$, the voltage $V_{n0}$ at node $n_0$ is higher than the voltage V1 but lower than the voltage V2. The LED module $D_1$ turns on. The multi-segment linear LED driver 14 conducts the constant current $I_{F1}$, and the current-compensating device 161 conducts the compensating current $I_{C1}$. The current flowing through the LED module $D_1$ comprises the constant current $I_{F1}$ and the compensating current $I_{C1}$, wherein the compensating current $I_{C1}$ changes with the voltage $V_{n0}$.

Referring to FIG. 2 and FIG. 3B, during the time period of $t_2$-$t_3$, the voltage $V_{n0}$ at node $n_0$ is higher than the voltage V2 but lower than the voltage V3. The LED modules $D_1$ and $D_2$ turn on. The multi-segment linear LED driver 14 stops conducting the constant current $I_{F1}$, but conducts the constant current $I_{F2}$. Since the current-compensating device 161 detects the conduction of LED modules $D_2$ according to the voltage at node $n_2$, the current-compensating device 161 stops conducting the compensating current $I_{C1}$. The current-compensating device 162 conducts the compensating current $I_{C2}$. The current flowing through the LED modules $D_1$ and $D_2$ comprises the constant current $I_{F2}$ and the compensating current $I_{C2}$, wherein the compensating current $I_{C2}$ changes with the voltage $V_{n0}$.

Referring to FIG. 2 and FIG. 3C, during the time period of $t_3$-$t_4$, the voltage $V_{n0}$ at node $n_0$ is higher than the voltage V3. The LED modules $D_1$, $D_2$ and $D_3$ turn on. The multi-segment linear LED driver 14 stops conducting the constant current $I_{F2}$, but conducts the constant current $I_{F3}$. Since the current-compensating device 162 detects the conduction of LED modules $D_3$ according to the voltage at node $n_3$, the current-compensating device 162 stops conducting the compensating current $I_{C2}$. The current-compensating device 163 conducts the compensating current $I_{C3}$. The current flowing through the LED modules $D_1$, $D_2$ and $D_3$ comprises the constant current $I_{F3}$ and the compensating current $I_{C3}$, wherein the compensating current $I_{C3}$ changes with the voltage $V_{n0}$. The operation of the current compensating device $16a$ (a=4~n) and the multi-segment linear LED driver 14, during the time period starting at time $t_a$, follows the rules as described in FIGS. 3A~3C.

As the voltage $V_{n0}$ descending from $V_{peak}$ to V1, the multi-segment linear LED driver 14 sequentially provides the current path for flowing the constant current $I_{Fn-1} \ldots I_{F3}, I_{F2}$ and $I_{F1}$, and the current-compensating devices 16(n-1) . . . 163, 162, 161 provide the corresponding compensating current. During descending of the voltage $V_{n0}$, the corresponding compensating current improves the current waveform of the internal current $I_B$ of the LED driving device 10, and thus indirectly improves the harmonic distortion of input current $I_A$ of the LED driving device 10 and reduces the harmonic current distortion of the alternating-current voltage source AC.

Figure 4:
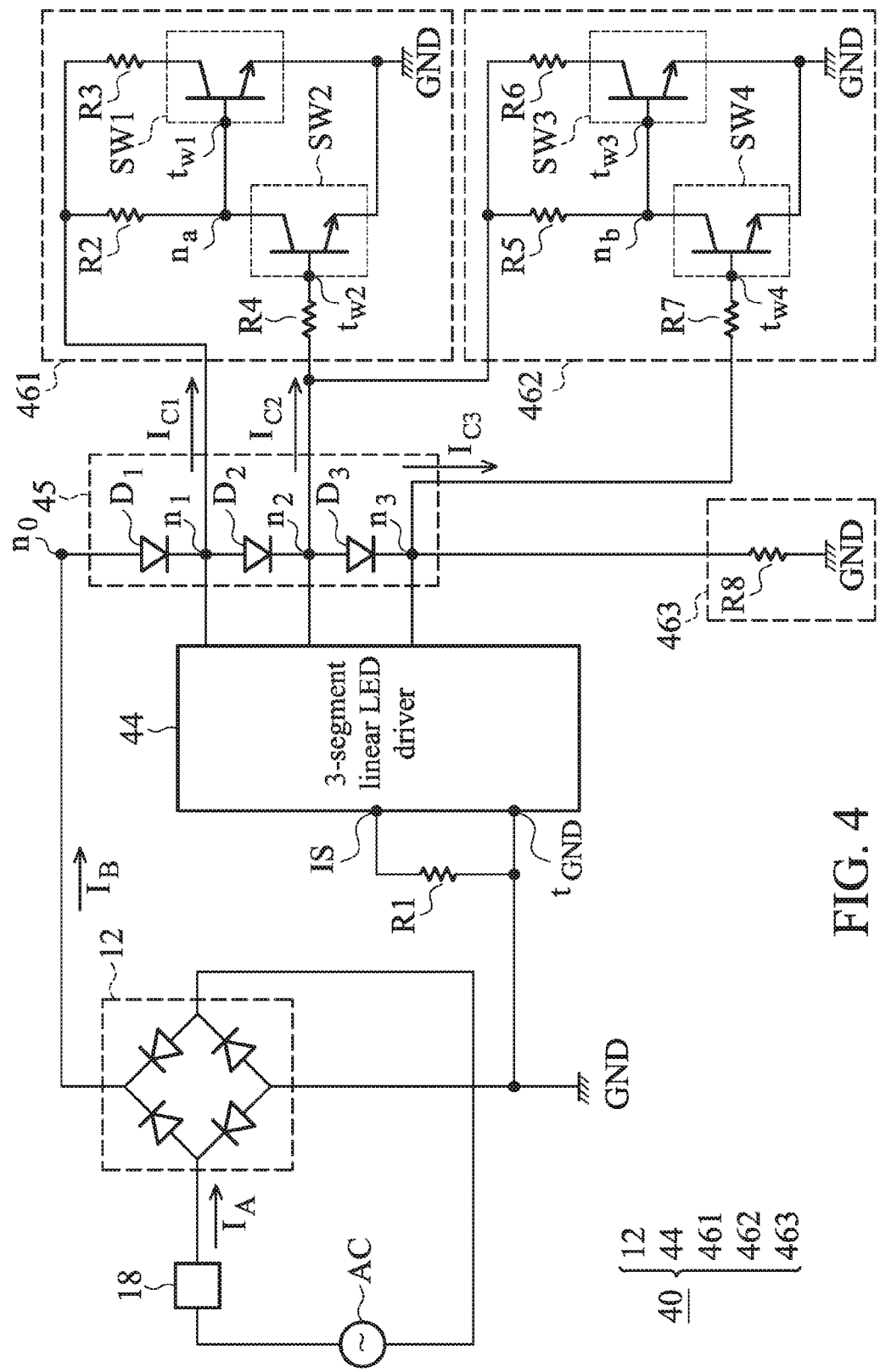
FIG. 4 shows a schematic diagram illustrating the connection of the LED driving device 40 and the LED device 45 according to an embodiment of the present disclosure.

FIG. 4 shows a schematic diagram illustrating the connection of the LED driving device 40 and the LED device 45 according to an embodiment of the present disclosure. The difference between FIG. 1 and FIG. 4 is the 3-segment linear LED driver 44 shown in FIG. 4 is an embodiment of the multi-segment linear LED driver 14 shown in FIG. 1. The LED device 45 shown in FIG. 4 is composed by three LED modules $D_1$, $D_2$ and $D_3$, wherein the LED module $D_3$ is the last of the serial LED modules of the LED device 45. The LED driving device 40 shown in FIG. 4 comprises three current-compensating devices 461, 462 and 463. The current-compensating device 461 of FIG. 4 corresponds to the current-compensating device 161 of FIG. 1. The current-compensating device 462 of FIG. 4 corresponds to the current-compensating device 162 of FIG. 1. The current-compensating device 463 of FIG. 4 corresponds to the current-compensating device 163 of FIG. 1. The 3-segment linear LED driver 44 has a current detection terminal IS and a reference ground terminal $t_{GND}$. The LED driving device 40 further comprises a resistor R1 which is coupled between the current detection terminal IS and the reference ground terminal $t_{GND}$ (which is connected to the reference ground GND) of the 3-segment linear LED driver 44.

The current-compensating device 461 comprises switch devices SW1 and SW2 and resistors R2, R3 and R4. The switch device SW1 and the resistor R3 are connected in series and coupled between the node $n_1$ and the reference ground GND. The switch device SW1 also has a control terminal $t_{w1}$ coupled to a node $n_a$. The switch device SW2 is coupled between the node $n_a$ and the reference ground GND. The switch device SW2 also has a control terminal $t_{w2}$ coupled to the resistor R4. The resistor R2 is coupled between the node $n_1$ and the node $n_a$. The resistor R4 is coupled between the control terminal $t_{w2}$ of the switch device SW2 and the node $n_2$. The resistance of the resistor R3 is set as:

$$R3 = \frac{V_{D2}}{(I_{F2} - I_{F1})},$$

wherein $V_{D2}$ is the conduction voltage value of the LED module $D_2$.

The current-compensating device 462 comprises switch devices SW3 and SW4 and resistors R5, R6 and R7. The switch device SW3 and the resistor R6 are connected in series and coupled between the node $n_2$ and the reference ground GND. The switch device SW3 also has a control terminal $t_{w3}$ coupled to a node $n_b$. The switch device SW4 is coupled between the node $n_b$ and the reference ground GND. The switch device SW4 also has a control terminal $t_{w4}$ coupled to the resistor R7. The resistor R5 is coupled between the node $n_2$ and the node $n_b$. The resistor R7 is coupled between the control terminal $t_{w4}$ of the switch device SW4 and the node $n_3$. The resistance of the resistor R6 is set as:

$$R6 = \frac{V_{D3}}{(I_{F3} - I_{F2})},$$

wherein $V_{D3}$ is the conduction voltage value of the LED module $D_3$.

The current-compensating device 463 comprises a resistor R8. The resistor R8 is coupled between the node $n_3$ and the reference ground GND.

Figure 5:
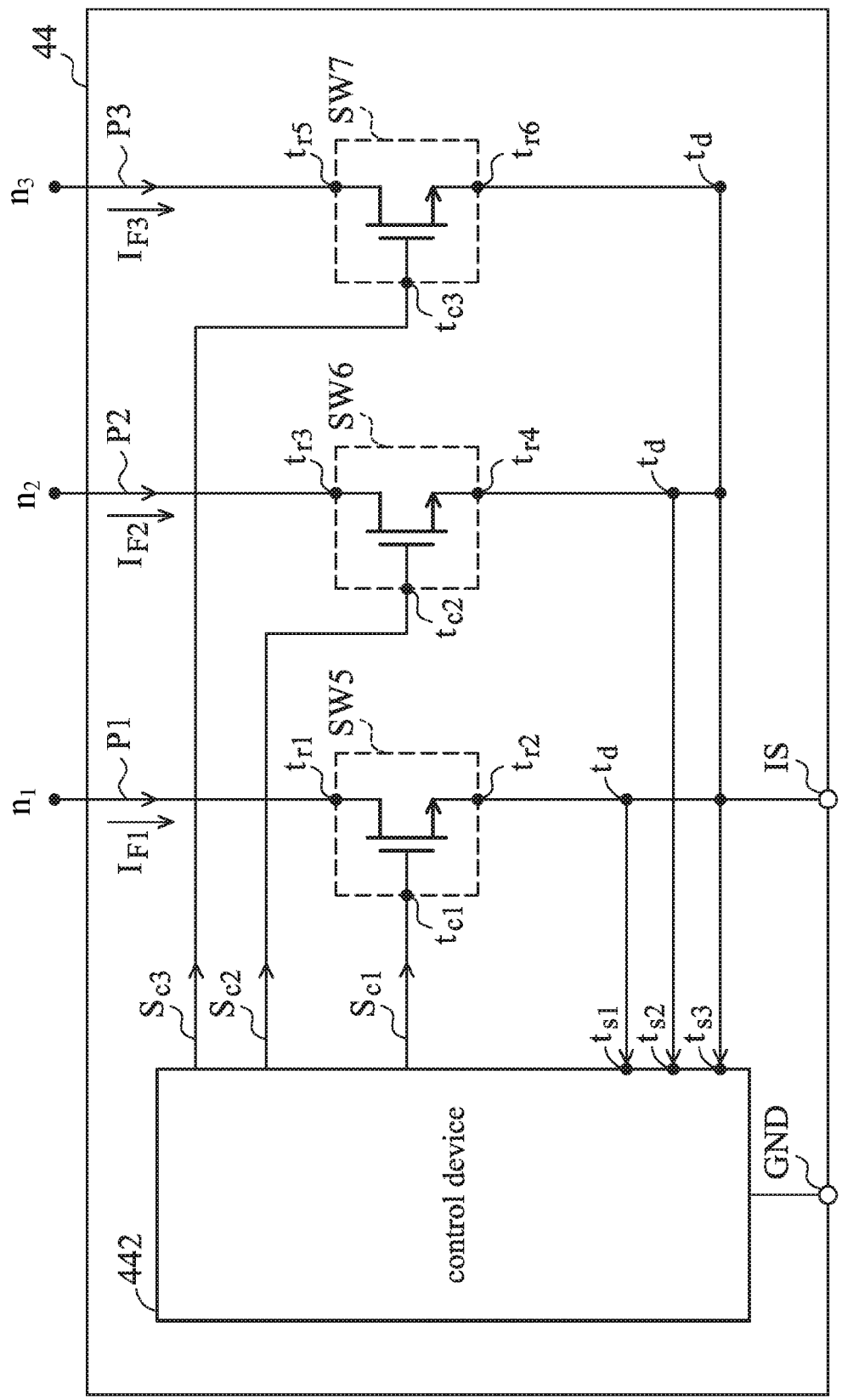
FIG. 5 shows an internal circuit diagram of the 3-segment linear LED driver 44 shown in FIG. 4 according to an embodiment of the present disclosure.

FIG. 5 shows an internal circuit diagram of the 3-segment linear LED driver 44 shown in FIG. 4 according to an embodiment of the present disclosure. The 3-segment linear LED driver 44 comprises a control device 442 and switch devices SW5, SW6 and SW7. The switch devices SW5, SW6 and SW7 may be, for example MOSFET or BJT, but is not limited thereto. The switch device SW5 has a first terminal $t_{r1}$ coupled to the cathode of the LED module $D_1$ through the node $n_1$, a second terminal $t_{r2}$ couple to the detection point $t_d$ and a control terminal $t_{c1}$ couple to the control device 442. The switch device SW6 has a first terminal $t_{r3}$ coupled to the cathode of the LED module $D_2$ through the node $n_2$, a second terminal $t_{r4}$ couple to the detection point $t_d$ and a control terminal $t_{c2}$ couple to the control device 442. The switch device SW7 has a first terminal $t_{r5}$ coupled to the cathode of the LED module $D_3$ through the node $n_3$, a second terminal $t_{r6}$ couple to the detection point $t_d$ and a control terminal $t_{c3}$ couple to the control device 442. The internal circuit structure of the multi-segment LED driver 14 shown in FIG. 1 is similar to that of the 3-segment linear LED driver 44 shown in FIG. 4. The difference is the LED device of FIG. 1 has n LED modules such that the multi-segment LED driver 14 of FIG. 1 has n switch devices.

The control device 442 outputs control signals $S_{c1}$, $S_{c2}$ and $S_{c3}$ to the control terminal $t_{c1}$ of the switch device SW5, the control terminal $t_{c2}$ of the switch device SW6 and the control terminal $t_{c3}$ of the switch device SW7 for selectively switching the switch device SW5, SW6 and SW7 to provide the paths P1, P2 or P3. More specifically, the control device 442 provides one of the paths P1, P2, and P3. the control device 442 further comprises sensing terminal $t_{s1}$, $t_{s2}$ and $t_{s3}$ coupled to the detection point $t_d$ (the detection point $t_d$ is also coupled to the current detection terminal IS) and controls stability of the constant current $I_{F1}$, $I_{F2}$ and $I_{F3}$ according to the signals from the sensing terminal $t_{s1}$, $t_{s2}$ and $t_{s3}$.

Figure 6A:
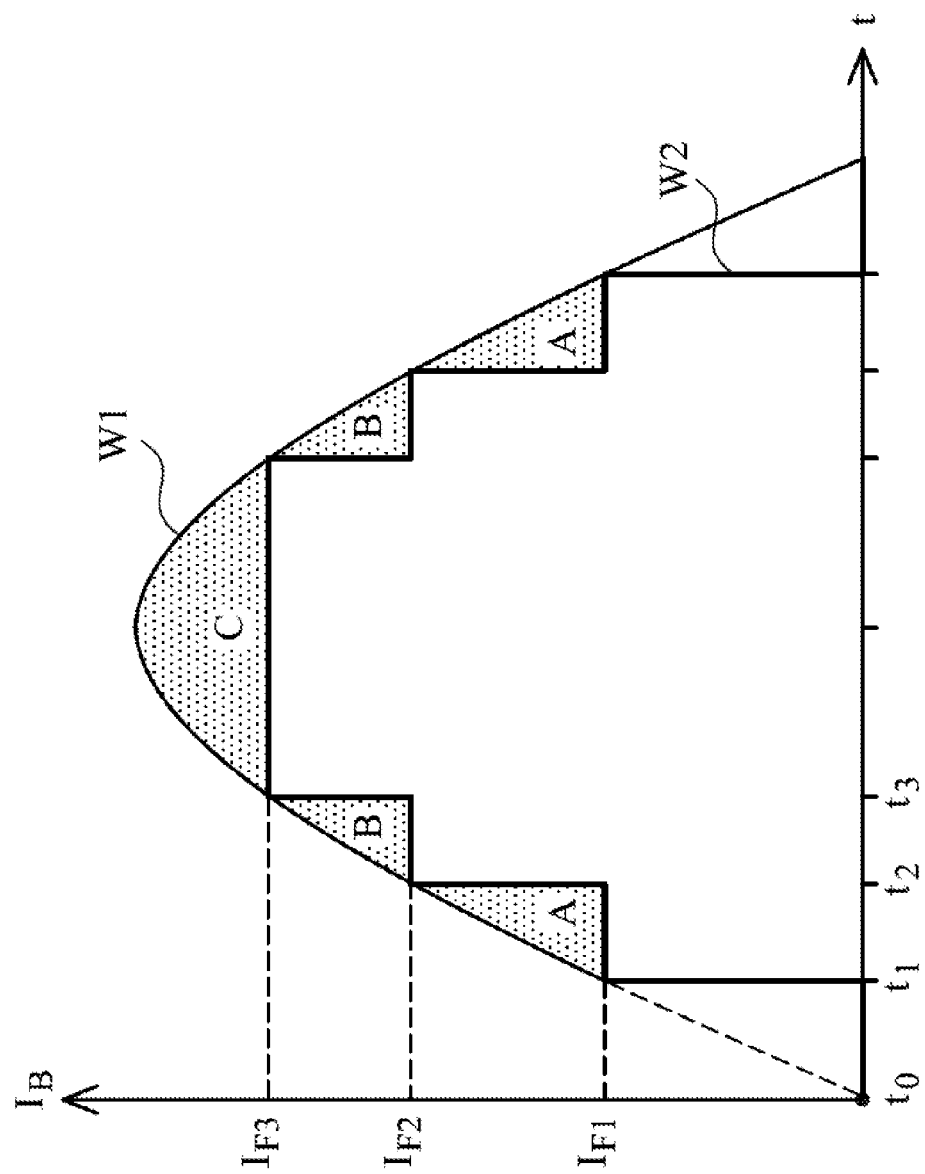
FIG. 6A shows a current waveform diagram of $I_B$ according to an embodiment of the present disclosure.
Figure 6B:
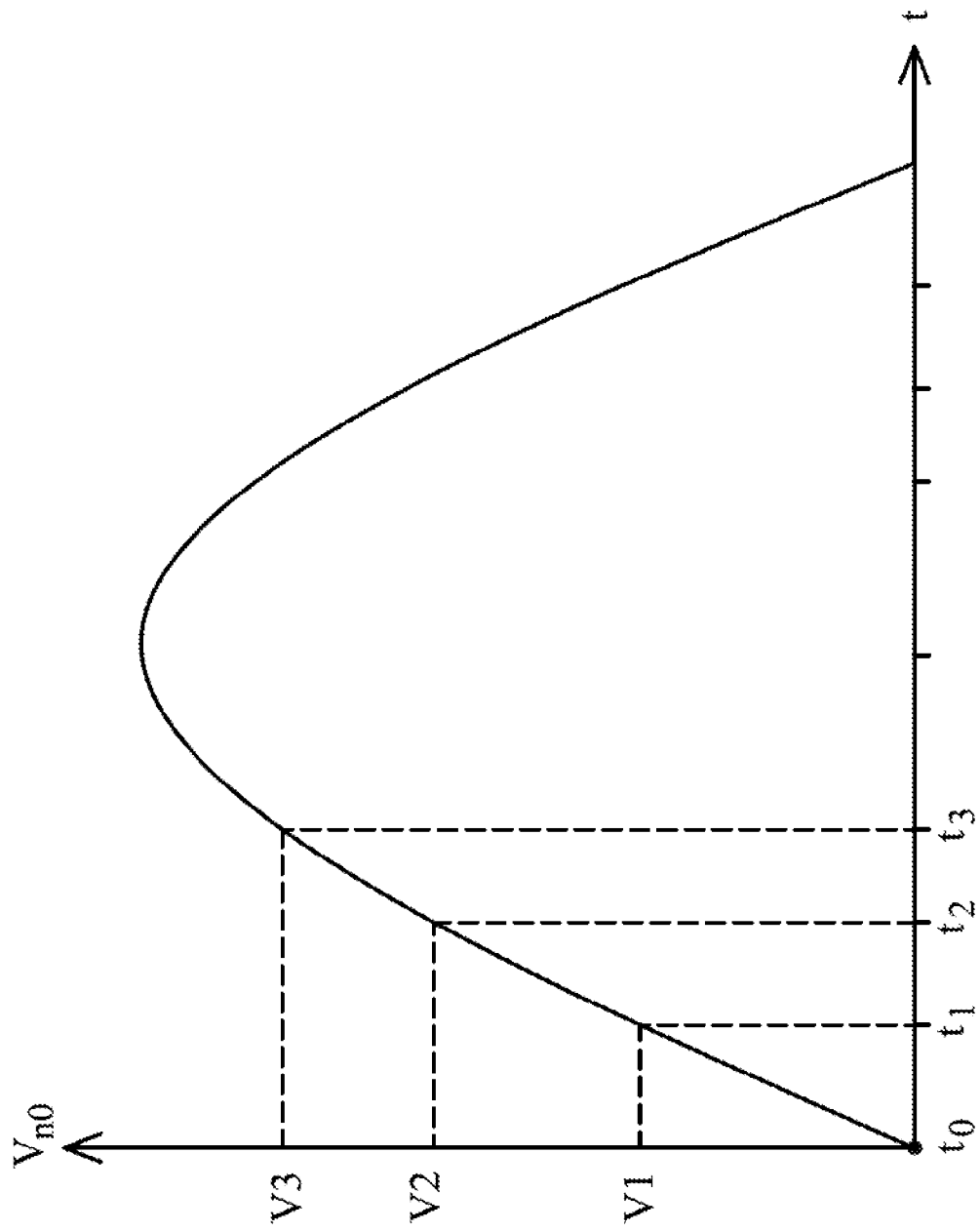
FIG. 6B shows a voltage waveform diagram at the node $n_0$ of FIG. 4 according to an embodiment of the present disclosure.

Referring to FIG. 4, the LED driving device 40 of the present disclosure, through improving the current waveform of the internal current $I_B$ of the LED driving device 40, indirectly improves the harmonic distortion of input current $I_A$ of the LED driving device 40. FIG. 6A shows a current waveform of $I_B$ according to an embodiment of the present disclosure. FIG. 6B shows a voltage waveform at the node $n_0$ of FIG. 4 according to an embodiment of the present disclosure. Referring to FIG. 5, the 3-segment linear LED driver 44 selectively provides the path P1 to the LED module $D_1$ for flowing the constant current $I_{F1}$, the path P2 to the LED modules $D_1$ and $D_2$ for flowing the constant current $I_{F2}$, or the path P3 to the LED modules $D_1$, $D_2$ and $D_3$ for flowing the constant current $I_{F3}$. Because the 3-segment linear LED driver 44 separately conducts the constant current $I_{F1}$, $I_{F2}$ and $I_{F3}$, the waveform W2 of current $I_B$ shown in FIG. 6A is stepwise. The waveform W2 of current $I_B$ leads to the harmonic distortion of current $I_A$ provided by the alternating-current voltage source AC. For improving the harmonic distortion of current $I_A$, the waveform of current $I_A$ should be adjusted so that it is closed to the sinusoid waveform W1. For this purpose, the current-compensating device 461 provides the compensating current $I_{C1}$ flowing through the resistor R3 and the switch device SW1 to the reference ground GND when the 3-segment linear LED driver 44 conducts the constant current $I_{F1}$. The current-compensating device 462 provides the compensating current $I_{C2}$ flowing through the resistor R6 and the switch device SW3 to the reference ground GND when the 3-segment linear LED driver 44 conducts the constant current $I_{F2}$. The current-compensating device 463 provides the compensating current $I_{C3}$ flowing through the resistor R8 to the reference ground GND when the 3-segment linear LED driver 44 conducts the constant current $I_{F3}$. By the above method, the waveform of current $I_A$ can be adjusted to approximate sinusoid waveform for improving the harmonic distortion of current $I_A$.

Specifically, refer to FIG. 6A, during the time period of $t_0$-$t_1$, the voltage $V_{n0}$ at node $n_0$ is lower than the voltage V1. The LED module $D_1$ turns off. There is no current flowing through any one of the LED device 45.

During the time period of $t_1$-$t_2$, the voltage $V_{n0}$ at node $n_0$ is higher than the voltage V1. The LED module $D_1$ turns on. The control device 442 provides the path P1 to the LED module $D_1$ for flowing the constant current $I_{F1}$, and controls the constant current $I_{F1}$ according to the signal from the sensing terminal $t_{s1}$, i.e. controlling the value of the constant current $I_{F1}$ to remain constant. When the path P1 is provided, the compensating current $I_{C1}$ flows through the current-compensating device 461, wherein the increased value of the compensating current $I_{C1}$ is shown as the region A of FIG. 6A. The current flowing through the LED module $D_1$ comprises the constant current $I_{F1}$ and the compensating current $I_{C1}$.

During the time period of $t_2$-$t_3$, the voltage $V_{n0}$ at node $n_0$ is higher than the voltage V2 but lower than V3. The LED modules $D_1$ and $D_2$ turn on. The control device 442 determines the conduction of the LED module $D_2$ according to the voltage at the sensing terminal $t_{s2}$, and outputs control signal $S_{c1}$ to the control terminal $t_{c1}$ of the switch device SW5 such that the switch device SW5 turns off and the path P1 (to the LED module $D_1$) of the constant current $I_{F1}$ is not provided. The control device 442 changes to provide the path P2 to the LED modules $D_1$ and $D_2$ for flowing the constant current $I_{F2}$. When the path P2 is provided, the current-compensating device 461 stops conducting the compensating current $I_{C1}$. Specifically, refer to FIG. 4, when the LED module $D_2$ turns on, the voltage at node $n_2$ increases as the increasing of the voltage $V_{n0}$ at node $n_0$ such that the switch device SW2 of the current-compensating device 461 turns on. The voltage at node $n_a$ is substantially equal to ground voltage such that the switch device SW1 turns off and the current-compensating device 461 stops conducting the compensating current $I_{C1}$. In the design, for example through adjusting the resistance of resistor R2, the current through the switch device SW2 can be ignored when the switch device SW2 turns on. Additionally, when the path P2 is provided (i.e. the LED module $D_2$ turns on), the compensating current $I_{C2}$ flows through the current-compensating device 462, wherein the increased value of the compensating current $I_{C2}$ is shown as the region B of FIG. 6A. The current flowing through the LED modules $D_1$ and $D_2$ comprises the constant current $I_{F2}$ and the compensating current $I_{C2}$.

Then the voltage $V_{n0}$ at node $n_0$ gradually goes higher. After the time point $t_3$, the voltage $V_{n0}$ at node $n_0$ is higher than the voltage V3. The LED modules $D_1$, $D_2$ and $D_3$ turn on. The control device 442 determines the conduction of the LED module $D_3$ according to the voltage at the sensing terminal $t_{s3}$, and outputs control signal $S_{c2}$ to the control terminal $t_{c2}$ of the switch device SW6 such that the switch device SW6 turns off and the path P2 (to the LED modules $D_1$ and $D_2$) of the constant current $I_{F2}$ is not provided. The control device 442 changes to provide the path P3 for the constant current $I_{F3}$ flowing through the LED modules $D_1$, $D_2$ and $D_3$. When the path P3 is provided, the current-compensating device 462 stops conducting the compensating current $I_{C2}$. Specifically, refer to FIG. 4, when the LED module $D_3$ turns on, the voltage at node $n_3$ increases as the increasing of the voltage $V_{n0}$ at node $n_0$ such that the switch device SW4 of the current-compensating device 462 turns on. The voltage at node $n_b$ is virtually coupled to ground such that the switch device SW3 turns off and the current-compensating device 462 stops conducting the compensating current $I_{C2}$. In the design, for example through adjusting the resistance of resistor R5, the current can be ignored when the switch device SW4 turns on, such that the current-compensating device 462 achieves the purpose as stopping conducting the compensating current $I_{C2}$. Additionally, when the path P3 is provided (i.e. the LED module $D_3$ turns on), the compensating current $I_{C3}$ flows through the current-compensating device 463, wherein the increased value of the compensating current $I_{C3}$ is shown as the region C of FIG. 6A. The current flew through the LED modules $D_1$, $D_2$ and $D_3$ comprises the constant current $I_{F3}$ and the compensating current $I_{C3}$.

The stepwise waveform W2 of current $I_B$ shown in FIG. 6A illustrates the LED driving device without the current-compensating devices. Conversely, as shown in FIG. 6A, the current-compensating devices 461-463 respectively compensates regions A, B and C such that the waveform W1 of current $I_B$ illustrating the LED driving device provided with the current-compensating devices 461-463 is similar to a sinusoidal waveform. And thus it improves the harmonic current distortion of current $I_A$. In addition, the compensating current $I_{C1}$ provided by the current-compensating device 461 flows through the LED module $D_1$ and thereby increases the usage of the LED module $D_1$. Similarly, the compensating current $I_{C2}$ provided by the current-compensating device 462 flows through the LED modules $D_1$ and $D_2$, and thereby increases the usages of the LED modules $D_1$ and $D_2$. Similarly, the compensating current $I_{C3}$ provided by the current-compensating device 463 flows through the LED modules $D_1$, $D_2$ and $D_3$, and thereby increases the usages of the LED modules $D_1$, $D_2$ and $D_3$.

Figure 7:
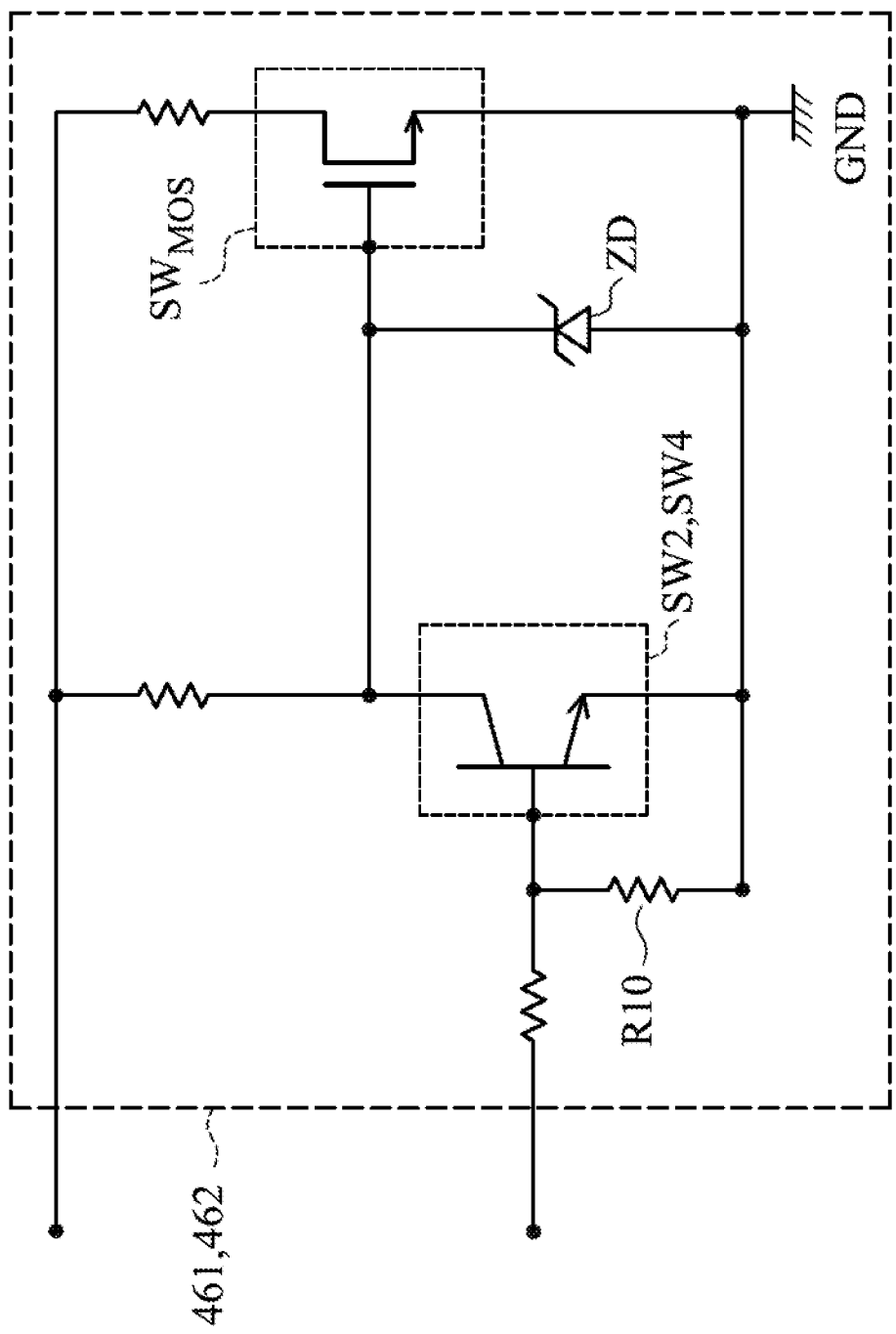
FIG. 7 shows a current-compensating circuit according to an embodiment of the present disclosure.

FIG. 7 shows a current-compensating circuit according to an embodiment of the present disclosure. The current-compensating devices 461 and 462 shown in FIG. 4 also can be replaced by the circuit shown in FIG. 7. In FIG. 7, the switch device $SW_{MOS}$ comprises a Metal-Oxide-Semiconductor Field-Effect Transistor (MOSFET). The MOSFET replaces the bipolar junction transistors (BJTs) of the switch devices SW1 and SW3 respectively in the current-compensating devices 461 and 462. The zener diode ZD in FIG. 7 is used to bias the switch device $SW_{MOS}$. Additionally, the resistor R10 is used to control the initialization speed of the switch device.

The LED driving devices 10 and 40 of the present disclosure and the method for improving harmonic current distortion on the LED driving device can improve the harmonic current distortion, increase the usage of LED and contribute to improve the overall light output, and enhance the power factor.

While the present disclosure has been described by way of example and in terms of preferred embodiment, it should be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A light emitting diode (LED) driving device to drive a LED device which is composed by a plurality of LED modules connected in series, the LED device being coupled to a driving voltage source, the LED driving device comprising:
   a multi-segment linear LED driver, coupled to the LED modules, selectively providing a first path to a first LED module of the LED modules for flowing a first constant current, or providing a second path to the first LED module and a second LED module of the LED modules for flowing a second constant current;
   a first current-compensating device being connected to the second module in parallel, wherein when the first path is provided, the first current-compensating device conducts a first compensating current, and when the second path is provided, the first current-compensating device stops conducting the first compensating current; and
   a second current-compensating device coupled to the second LED module, wherein when the second path is provided, a second compensating current flows through the second current-compensating device conducts a second compensating current.

2. The LED driving device of claim 1, wherein the multi-segment linear LED driver further selectively provides a third path to the first LED module, the second LED module and a third LED module of the LED modules, for flowing a third constant current, wherein when the third path is provided, the first current-compensating device stops conducting the first compensating current, and the second current-compensating device stops conducting the second compensating current.

3. The LED driving device of claim 2, wherein the third LED module is the last LED module of the serial LED modules, and the LED driving device further comprises:
   a third current-compensating device coupled to the third LED module, wherein when the third path is provided, the third current-compensating device conducts a third compensating current.

4. The LED driving device of claim 1, wherein the multi-segment linear LED driver comprises:
   a first switch having a first terminal coupled to an anode of the first LED module and a second terminal coupled to a detection point;
   a second switch having a first terminal coupled to the anode of the second LED module and a second terminal coupled to the detection point; and
   a control device outputting a first and a second control signal respectively to the control terminals of the first and second switch for selectively switching the first and second switch and thereby providing the first and second paths, wherein the control device further comprises a first sensing terminal and a second sensing terminal which are coupled to the detection point, and controls the first and second current according to the signals of the first and second sensing terminals.

5. The LED driving device of claim 4, further comprising;
   a rectifier, coupled between the LED device and an alternating-current (AC) voltage source, to transform the AC voltage source into the driving voltage source.

6. A method for improving harmonic current distortion on a light emitting diode (LED) driving device, wherein the LED driving device is used to drive a LED device which is composed by a plurality of LED modules connected in serial and the LED device is coupled to a driving voltage source, the method comprising:
   providing, selectively, a first path to a first LED module of the LED modules for flowing a first constant current, or providing a second path to the first LED module and a second LED module of the LED modules for flowing a second constant current;
   providing a first compensative path such that a first compensating current flows through the first current-compensating device when the first path is provided; and
   providing a second compensative path such that a second compensating current flows through the second current-compensating device, and stopping conducting the first compensating current when the second path is provided.

7. The method of claim 6, comprising:
   selectively providing a third path for a third constant current flowing through to the first LED module, the second module, and a third LED module of the LED modules; and
   stopping conducting the first and the second compensating current when the third path is provided.

8. The method of claim 7, wherein the third LED module is the last LED module of the serial LED modules, the method further comprising:
   driving the third compensating current flow through the first, second and third LED modules when the third path is provided.

* * * * *